2,831,836

COPOLYMERS OF N-VINYLPYRROLIDONE AND DIALLYL ESTERS OF DIBASIC ACIDS

Americo L. Forchielli, Watertown, Mass., assignor to General Aniline & Film Corporation, New York, N. Y., a corporation of Delaware No Drawing. Application June 16, 1955
Serial No. 516,032

8 Claims. (Cl. 260—78.5)

The present invention relates to a new class of copolymers obtained by copolymerizing an N-vinylpyrrolidone with a diallyl ester of a dicarboxylic acid.

I have found that by copolymerizing an N-vinylpyrrolidone with a diallyl ester of a dicarboxylic acid it is possible to obtain two types of copolymers, one being soluble in water, lower alkyl alcohols, and the like and the other insoluble in solvents such as ethyl acetate, carbon tetrachloride, 2-butanone, benzene and the like. The soluble type is readily prepared by carefully controlling the proportion of a diallyl ester of a dicarboxylic acid which must not exceed 10% by weight of the copolymerizing mixture. The insoluble, or cross-linked copolymers, must contain 11 or more percent of a diallyl ester of a dicarboxylic acid in order to arrive at a cross-linked copolymer which is insoluble not only in water but the aforementioned solvent.

The method of preparing the copolymers of an N-vinylpyrrolidone with a diallyl ester of a dicarboxylic acid consists of essentially dissolving the monomers in a suitable solvent such as benzene in the presence of a polymerization catalyst such as $\alpha,\alpha'$-azodiisobutyronitrile or organic peroxides such as benzoyl peroxide, lauroyl peroxide, tert-butyl hydroperoxide, and others, and heating the solution to effect polymerization.

The unusual feature of the copolymers of the present invention is that when prepared in benzene solution they yield viscous solutions after the copolymerization reaction has been completed. However, upon removal of the benzene the dry copolymers are not redissolvable in benzene. The copolymers of N-vinylpyrrolidone containing from 11–90% by weight of a diallyl ester of a dicarboxylic acid are cross-linked and form a gel in benzene in which they are prepared. The addition of more benzene does not reduce the viscosity of the gel but rather increases the gel volume. This feature makes it possible to provide for commercial applications, gels of the copolymers in various liquids such as benzene, toluene xylene, and the like.

In preparing the water-soluble type polymers, it is absolutely essential that the amount of the diallyl ester of the dicarboxylic acid be not less than 5 and not more than 10% by weight of the comonomeric mixture. When the percentage of the diallyl ester of a dicarboxylic acid is increased to 11% and higher, up to and including 95% by weight, and the remainder (5 to 89%) being an N-vinylpyrrolidone, water-insoluble copolymers soluble in the aforementioned organic solvents are obtained. The water soluble copolymers, i. e., containing from 5–10% by weight of a diallyl ester of a dibasic dicarboxylic acid have been found to be advantageously employed in various film applications where reduced water solubility of polyvinylpyrrolidone is desired. By various trial experiments I have found that they are extremely useful not only as sizes for textiles and polyvinylpyrrolidone yarns, but also as beverage clarifiers, in the lithographing arts and as ingredients in adhesive compositions to reduce water solubility of pressure sensitive adhesives such as are used on labels, tapes and decals.

The cross-linked copolymers, i. e., those that are insoluble in water and contain from 11–95% by weight of a diallyl ester of a dibasic dicarboxylic acid are advantageously employed as thermosetting resins alone or together with the customary plasticizers, styrene-type polyesters, and the like, to impart effects not obtainable with commercial polyester resins. One of the unusual effects of the resins is the adherence to glass and glass yarn, such as, for example, glass yarn sizing applications, so as to render the sized glass susceptible to dyes.

The N-vinylpyrrolidones which are copolymerized with the diallyl ester of the dibasic acid are characterized by the following general formula:

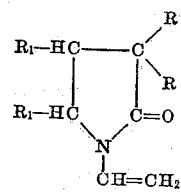

wherein R represents hydrogen or methyl group and $R_1$ represents either hydrogen, methyl or ethyl.

As illustrative examples of such N-vinylpyrrolidones the following may be mentioned:

5-methyl-N-vinyl-2-pyrrolidone
5-ethyl-N-vinyl-2-pyrrolidone
3,3-dimethyl-N-vinyl-2-pyrrolidone
3-methyl-N-vinyl-2-pyrrolidone
3-ethyl-N-vinyl-2-pyrrolidone
4-methyl-N-vinyl-2-pyrrolidone
4-ethyl-N-vinyl-2-pyrrolidone The diallyl esters of dicarboxylic acids may be constituted of either unsaturated or saturated dibasic acids. The nature or character of the dicarboxylic acid is immaterial so long as it is capable of reacting with allyl alcohol or allyl chloride to form the corresponding diallyl ester.

As examples of ethylenically linked dicarboxylic acid, the following may be mentioned:

Maleic acid
Fumaric acid
Aconitic acid
Mesaconic acid
Citraconic acid
Ethylmaleic acid
Pyrocinchoninic acid
Xeronic acid
Itaconic acid As illustrative examples of saturated dicarboxylic acids, the following may be mentioned:

Phthalic acid
Tetrachlorophthalic acid
Succinic acid
Adipic acid
Suberic acid
Azelaic acid
Sebacic acid
Dimethylsuccinic acid
Chlorinated derivatives of the above acids The diallyl esters of all of the foregoing saturated and unsaturated dicarboxylic acids are listed not only in the literature and various patents but are also commercially available. Hence, no difficulty will be encountered by any one in the practice of the present invention. It is to be noted that a mixture of two or more diallyl esters may be copolymerized with an N-vinylpyrrolidone.

The invention will be described in greater detail in conjunction with the following examples. It is to be understood that these examples are merely illustrative, and it is not intended that the scope of the invention be limited to the details set forth herein.

Example I

First, 277.5 grams of N-vinyl-2-pyrrolidone and 61.5 grams of diallyl phthalate were dissolved in 500 ml. of (C. P.) benzene and charged into a 2-liter, 3-neck, round-bottom flask equipped with reflux condenser, stirrer and separatory funnel. After heating the solution for about 5 minutes, 1.7 grams of $\alpha,\alpha'$-azodiisobutyronitrile dissolved in 25 ml. of benzene were then added and refluxed, while stirring continued. After 45 minutes of refluxing, a viscous gel mass formed in the flask. The addition of 200 ml. of benzene to the gelled mass did not reduce the viscosity of the gel. The gel was allowed to cool to room temperature and then transferred to a tared glass tray for solvent evaporation under vacuum. A clear, light brown, hard resinous polymer was obtained. The weight of polymer obtained was 343 grams or 101% of theory.

The dry polymer was cross-linked since it was insoluble in water, alcohols, benzene, ethyl acetate, 2-butanone and other solvents. The polymer was easily ground into a very fine powder in a Mikro-Pulverizer.

Example II

A benzene solution of 111 grams of N-vinyl-2-pyrrolidone and 0.246 gram of diallyl phthalate was charged into a 2-liter, 3-neck, round-bottom flask equipped with stirrer, reflux condenser and separatory funnel and 400 ml. of (C. P.) benzene added. After heating the solution to reflux for about 5 minutes, 0.56 gram of $\alpha,\alpha'$-azodiisobutyronitrile dissolved in 25 ml. of benzene was added and refluxing while stirring was continued for seven hours. After standing overnight at room temperature, the clear solution was transferred to a tared glass tray and solvent removed by vacuum. A yield of 108.5% of theory was obtained.

Analysis for nitrogen in the dry polymer gave 11.3% which corresponds to 89.6% vinylpyrrolidone and 10.4% diallyl phthalate chemically bound in the polymer. The copolymer was found to be soluble in water, methyl alcohol, ethyl alcohol, isopropyl alcohol, and insoluble in ethyl acetate, carbon tetrachloride, 2-butanone, benzene and Freon 113.

Example III

A total of 111 grams of N-vinyl-2-pyrrolidone and 3.66 grams of diallyl phthalate was charged into a 2-liter, 3-neck, round-bottom flask equipped with stirrer, reflux condenser and separatory funnel and the mixture dissolved in 300 ml. of (C. P.) benzene. After heating to reflux for about 5 minutes, 0.57 gram of $\alpha,\alpha'$-azodiisobutyronitrile dissolved in 25 ml. of benzene was added. Refluxing while stirring was continued for 3 hours. Within 2 hours of refluxing the solution became very viscous, and an additional 300 ml. of benzene was added. The clear, less viscous solution was then refluxed for an additional 1 hour period. Upon removal of benzene by vacuum, a colorless polymer was obtained which gave a yield of 113% of theory. Analysis for nitrogen in the dry polymer gave 11.2%, which corresponds to 89% vinylpyrrolidone and 11% diallyl phthalate in the dry polymer. The copolymer was found to be insoluble in water, methyl alcohol, ethyl alcohol, isopropyl alcohol, ethyl acetate, carbon tetrachloride, 2-butanone, benzene and Freon 113. This indicated that cross-linking had occurred.

Example IV

A mixture of 111 grams of 5-methyl-N-vinyl-2-pyrrolidone and 1.23 grams of diallyl phthalate dissolved in 300 ml. of benzene was charged into a 2-liter, 3-neck, round-bottom flask equipped with stirrer, reflux condenser and separatory funnel. After heating to reflux for about 5 minutes, 0.56 gram of $\alpha,\alpha'$-azodiisobutyronitrile dissolved in 25 ml. of benzene was added and refluxing while stirring continued for a total of 6 hours. The clear viscous solution was allowed to stand overnight at room temperature and solvent removed by vacuum.

A colorless polymer was obtained in yield of 103% of theory. Analysis for nitrogen in the dry polymer gave 11.3% which corresponds to 90% vinylpyrrolidone and 10% diallyl phthalate in the dry polymer. The copolymer was found to be soluble in water, methyl alcohol, ethyl alcohol, isopropyl alcohol, and insoluble in ethyl acetate, carbon tetrachloride, 2-butanone, benzene and Freon 113.

Example V 75 grams of 3-methyl-N-vinyl-2-pyrrolidone, 20 grams of diallyl phthalate and 5 grams of diisooctyl phthalate were placed in a 150-ml. beaker and stirred to effect solution. To this solution 0.5 gram of dry lauroyl peroxide was added and the solution stirred until all of the lauroyl peroxide was dissolved. The beaker and contents were placed on a steam bath and heated. Within 10 minutes polymerization occurred in which a hard, clear brown resinous mass was obtained. The polymer was not attacked by water, alcohols or other organic solvents.

Example VI 50 grams of 4-ethyl-N-vinyl-2-pyrrolidone, 40 grams of diallyl phthalate and 10 grams of diisooctyl phthalate were dissolved in a 150-ml. beaker and 0.5 gram of benzoyl peroxide added and the mixture stirred until all of the peroxide was dissolved. The solution was poured into a petri dish of about 6" in diameter and allowed to stand at room temperature for 3 months. At the end of this period a clear, brown flexible polymer was obtained.

Example VII

Into a 2-liter, 3-neck, Pyrex flask equipped with a stirrer, condenser, and a separatory funnel was weighed: 111 grams of N-vinyl-2-pyrrolidone, 100 ml. of benzene, and 25 grams of diallyl tetrachlorophthalate. The mixture was stirred and heated to reflux temperature. At the reflux, 0.68 gram of $\alpha,\alpha'$-azodiisobutyronitrile dissolved in 25 ml. of benzene was added. Refluxing and stirring was continued for six hours.

Example VIII

Into a 2-liter, 3-neck, Pyrex flask equipped with a stirrer, condenser, and a separatory funnel was weighed: 111 grams of N-vinyl-2-pyrrolidone, 100 ml. of benzene, 5 grams of diallyl phthalate and 5 grams of diallyl tetrachlorophthalate. The mixture was stirred and heated to 40° C. At this point 0.68 gram of $\alpha,\alpha'$-azodiisobutyronitrile dissolved in 25 ml. of benzene was added. Heating at 40° C. and stirring was continued for a total of 5 hours.

Example IX

Into a 1-liter, 3-neck, Pyrex flask equipped with an Allihn condenser, a stirer, and a separatory funnel was weighed: 100 grams of 3-methyl-N-vinyl-2-pyrrolidone, 60 grams of dimethylallyl phthalate, and 40 grams of benzene. The flask and contents were stirred and heated to the reflux temperature. At this point 1.6 grams of $\alpha,\alpha'$-azodiisobutyronitrile dissolved in 20 grams of benzene were added. Heating at reflux and stirring were continued for a total of 6 hours.

Example X

Into a 2-liter, 3-neck, Pyrex flask equipped with an Allihn condenser, a stirrer, a separatory funnel, and a thermometer was weighted: 100 grams of 4-ethyl-N-vinyl-2-pyrrolidone, 20 grams of bis(2-chloroallyl) phthalate, and 40 grams of benzene. The flask and contents were heated to 35° C. To the flask via the separatory funnel was added 0.60 gram of $\alpha,\alpha'$-azodiisobutyronitrile dissolved in 20 grams of benzene. The flask was stirred and heated at 35° C. for a total of 20 hours.

Example XI

Into a 1-liter, 3-neck, Pyrex flask equipped with an Allihn condenser, a stirrer, a separatory funnel, and a thermometer was weighed: 50 grams of N-vinyl-2-pyrrolidone, 50 grams of allyl methallyl phthalate, and 30 grams of benzene. The flask and contents were stirred and heated to reflux temperature. At this point was added 0.50 gram of $\alpha,\alpha'$-azodiisobutyronitrile dissolved in 20 grams of benzene. The flask and contents were heated and stirred for a total of 6 hours.

The cross-linked copolymers prepared in accordance with Examples I, III, V, VII, IX, and XI are insoluble in water and the aforementioned solvents, and in view thereof are advantageously employed either alone or with the usual plasticizers and styrene-type polyester as thermosetting resins, yielding excellent adherence to glass and glass yarn. Such resin sized glass or glass yarn is susceptible to dyeing.

The water- and alcohol-soluble copolymers, i. e. not cross-linked, prepared in accordance with Examples II, IV, VIII, and X, have found useful application as textile sizes, and as components in pressure sensitive adhesives.

I claim:

1. A composition of matter comprising a copolymer of 5 to 95% of a diallyl ester of a dicarboxylic acid and 95 to 5% of an N-vinylpyrrolidone having the following general formula:

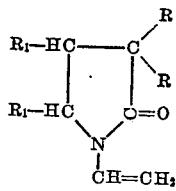

wherein R and $R_1$ represent a member selected from the group consisting of hydrogen, methyl and ethyl groups.

2. A composition of matter according to claim 1 wherein the N-vinylpyrrolidone is N-vinyl-2-pyrrolidone.

3. A composition of matter according to claim 1 wherein the N-vinylpyrrolidone is 3-methyl-N-vinyl-2-pyrrolidone.

4. A composition of matter according to claim 1 wherein the N-vinylpyrrolidone is 3,3-dimethyl-N-vinyl-2-pyrrolidone.

5. A composition of matter according to claim 1 wherein the N-vinylpyrrolidone is 4-methyl-N-vinyl-2-pyrrolidone.

6. A composition of matter according to claim 1 wherein the N-vinylpyrrolidone is 5-methyl-N-vinyl-2-pyrrolidone.

7. A composition of matter comprising a copolymer of 5 to 10% of a diallyl ester of a dicarboxylic acid and 95 to 90% of an N-vinylpyrrolidone having the following general formula:

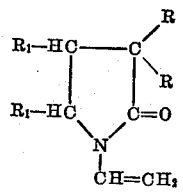

wherein R and $R_1$ represent a member selected from the group consisting of hydrogen, methyl and ethyl groups, said copolymers being characterized by the property of solubility in water and lower aliphatic alcohols.

8. A composition of matter comprising a copolymer of 11 to 95% of a diallyl ester of a dicarboxylic acid and 5 to 89% of an N-vinylpyrrolidone having the following general formula:

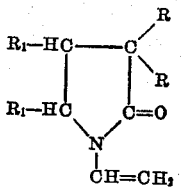

wherein R and $R_1$ represent a member selected from the group consisting of hydrogen, methyl and ethyl groups, said copolymers being characterized by the property of insolubility in water and lower aliphatic alcohols and other organic solvents, said property indicating cross-linkage in said copolymer.

References Cited in the file of this patent

UNITED STATES PATENTS

| | | |
|---|---|---|
| 2,471,959 | Hunt | May 31, 1949 |
| 2,665,271 | Beller | Jan. 5, 1954 |
| 2,667,473 | Morner | Jan. 26, 1954 |
| 2,676,949 | Morner | Apr. 27, 1954 |